United States Patent

Cho et al.

[11] Patent Number: 5,907,530
[45] Date of Patent: May 25, 1999

[54] OPTICAL PICKUP DEVICE

[75] Inventors: Kun-ho Cho, Suwon; Eung-ho Kim; Jang-hoon Yoo, both of Seoul; Kyung-hwa Rim, Suwon, all of Rep. of Korea

[73] Assignee: Samsung Electronics Co., Ltd., Suwon, Rep. of Korea

[21] Appl. No.: 08/708,200

[22] Filed: Sep. 6, 1996

Related U.S. Application Data

[63] Continuation-in-part of application No. 08/640,474, May 1, 1996, and application No. 08/640,553, May 1, 1996, Pat. No. 5,665,957.

[30] Foreign Application Priority Data

| Aug. 30, 1995 | [KR] | Rep. of Korea | 95-27715 |
| Sep. 25, 1995 | [KR] | Rep. of Korea | 95-31679 |
| Oct. 4, 1995 | [KR] | Rep. of Korea | 95-33913 |
| Oct. 4, 1995 | [KR] | Rep. of Korea | 95-33914 |
| Jan. 25, 1996 | [KR] | Rep. of Korea | 96-1605 |
| Feb. 14, 1996 | [KR] | Rep. of Korea | 96-3605 |

[51] Int. Cl.⁶ ........................ G11B 7/00
[52] U.S. Cl. .................... 369/112; 369/120
[58] Field of Search .................. 369/109, 110, 369/112, 94, 54, 58, 44.41, 44.42, 116, 118, 120

[56] References Cited

U.S. PATENT DOCUMENTS

| 1,646,292 | 10/1927 | Hough . |
| 2,724,305 | 11/1955 | Brandt . |
| 3,913,076 | 10/1975 | Lehureau et al. . |
| 3,971,002 | 7/1976 | Bricot et al. . |
| 4,465,369 | 8/1984 | Saegusa et al. . |
| 4,507,772 | 3/1985 | Yamamoto . |
| 4,695,158 | 9/1987 | Kotaka et al. . |

(List continued on next page.)

FOREIGN PATENT DOCUMENTS

| 0 492 844 A2 | 7/1992 | European Pat. Off. . |
| 59-104762 | 6/1984 | Japan . |
| 61-236032 | 11/1986 | Japan . |
| 61-251465 | 11/1986 | Japan . |
| 64-21727 | 1/1989 | Japan . |
| 2-306440 | 12/1990 | Japan . |
| 5-72497 | 3/1993 | Japan . |
| 5-303755 | 11/1993 | Japan . |
| 5-325245 | 12/1993 | Japan . |
| 6-176373 | 6/1994 | Japan . |
| 6-203406 | 7/1994 | Japan . |
| 7-302437 | 11/1995 | Japan . |
| 7-98431 | 11/1995 | Japan . |
| WO 96/28816 | 9/1996 | WIPO . |

OTHER PUBLICATIONS

Patent Abstracts of Japan, vol. 095, No. 001, Feb. 28, 1995 & JP 06 295467 A (Nippon Columbia Co Ltd), Oct. 21, 1994. (English Abstract)

*Primary Examiner*—Paul W. Huber
*Attorney, Agent, or Firm*—Burns, Doane, Swecker & Mathis, L.L.P.

[57] ABSTRACT

An optical pickup device which is capable of reproducing and recording information from at least two discs having different thicknesses includes a light source, an objective lens provided along the light path from the light source facing the plane of a disc and having a predetermined effective diameter, a beam splitter provided between the objective lens and the light source, a photodetector for detecting the beam split from the light splitter and reflected from the disc, and light controller provided along the light path facing the photodetector lens for controlling the light of the intermediate region between near- and far axis regions of an incident light beam. The optical pickup device is simplified and the manufacturing cost therefor is low. Also, by reducing the spherical aberration effect for the light, discs having different thicknesses can be used in a single disc drive.

17 Claims, 8 Drawing Sheets

U.S. PATENT DOCUMENTS

| | | |
|---|---|---|
| 4,704,024 | 11/1987 | Tsunekawa . |
| 4,712,885 | 12/1987 | Dawson et al. . |
| 4,816,665 | 3/1989 | Hsu . |
| 4,843,227 | 6/1989 | Matsui et al. . |
| 4,882,478 | 11/1989 | Hayashi et al. . |
| 5,097,464 | 3/1992 | Nishiuchi et al. ............... 369/112 |
| 5,146,258 | 9/1992 | Bell et al. . |
| 5,148,317 | 9/1992 | Foresi . |
| 5,272,501 | 12/1993 | Nishi et al. . |
| 5,281,797 | 1/1994 | Tatsuno et al. . |
| 5,349,592 | 9/1994 | Andó . |
| 5,446,565 | 8/1995 | Komma et al. ............... 369/112 X |
| 5,453,607 | 9/1995 | Ando et al. . |
| 5,496,995 | 3/1996 | Kato et al. . |
| 5,502,001 | 3/1996 | Okamoto . |
| 5,524,018 | 6/1996 | Adachi . |
| 5,526,336 | 6/1996 | Park et al. ............... 369/112 X |
| 5,526,338 | 6/1996 | Hasman et al. . |
| 5,565,986 | 10/1996 | Knuttel . |
| 5,615,199 | 3/1997 | Tatsuno et al. . |
| 5,621,717 | 4/1997 | Finkelstein et al. . |

OPTICAL PICKUP DEVICE

The present application is a continuation-in-part of U.S. application Ser. No. 08/640,553 filed on May 1, 1996, now U.S. Pat. No. 5,665,957, and U.S. application Ser. No. 08/640,474 filed on May 1, 1996, pending.

BACKGROUND OF THE INVENTION

The present invention relates to an optical pickup device, and more particularly, to an optical pickup device which is capable of reproducing and recording information from/onto at least two kinds of discs having different thicknesses.

An optical pickup records and reproduces information such as video or audio data onto/from recording media, e.g., discs (or disks). A disc has a structure including an information-recorded surface formed on a substrate. For example, the substrate can be made of plastic or glass. In order to read or write information from a high-density disc, the diameter of the optical spot must be very small. To this end, the numerical aperture of an objective lens is generally made large and a light source having a shorter wavelength is used. However, when using the shorter wavelength light source and an objective lens having a large numerical aperture (NA), a tilt allowance of the disc with respect to optical axis is reduced. The thus-reduced disc tilt allowance can be increased by reducing the thickness of the disc.

Assuming that the tilt angle of the disc is $\theta$, the magnitude of a coma aberration coefficient $W_{31}$ can be obtained from:

$$W_{31} = -\frac{d}{2}\left(\frac{n^2(n^2-1)\sin\theta\cos\theta}{(n^2-\sin^2\theta)^{\frac{5}{2}}}\right)NA^3$$

where d and n represent the thickness and refractive index of the disc, respectively. As understood from the above relationship, the coma aberration coefficient is proportional to the cube of the numerical aperture (NA). Therefore, considering that the NA of the objective lens required for a conventional compact disc (CD) is 0.45 and that for a conventional digital video disc or digital versatile disc (DVD) is 0.6 (to accommodate the higher information density), the DVD has a coma aberration coefficient of about 2.34 times that of the CD having the same thickness for a given tilt angle. Thus, the maximum tilt allowance of the DVD is reduced to about half that of the conventional CD. In order to conform the maximum tilt allowance of the DVD to that of the CD, the thickness d of the DVD could be reduced.

However, such a thickness-reduced disc using a shorter wavelength (high density) light source, e.g., a DVD, cannot be used in a recording/reproducing apparatus such as a disc drive for the conventional CDS using a longer wavelength light source because a disc having an non-standard thickness is influenced by spherical aberration to a degree corresponding to the difference in disc thickness from that of a normal disc. If the spherical aberration is extremely increased, the spot formed on the disc cannot have the light intensity needed for recording information, which prevents the information from being recorded precisely. Also, during reproduction of the information, the signal-to-noise (S/N) ratio is too low to reproduce the recorded information exactly.

Therefore, an optical pickup adopting a light source having a short wavelength, e.g., 650 nm, which is compatible for discs having different thicknesses, such as a CD or a DVD, is necessary.

For this purpose, research into apparatuses which can reproduce and record information from/onto at least two kinds of discs having different thicknesses with a single optical pickup device adopting a shorter wavelength light source are underway. Lens devices adopting a combination of a hologram lens and a refractive lens have been proposed in, for example, Japanese Patent Laid-Open Publication No. Hei 7-98431.

Figure 1:
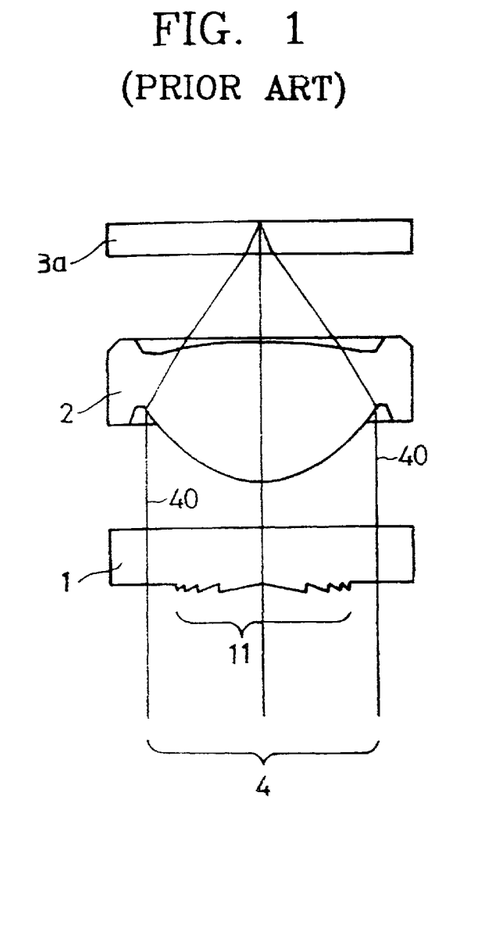
FIGS. 1 and 2 are schematic diagrams of a conventional optical pickup device having a hologram lens, showing the states where a light beam is focused onto a thin disc and a thick disc, respectively.
Figure 2:
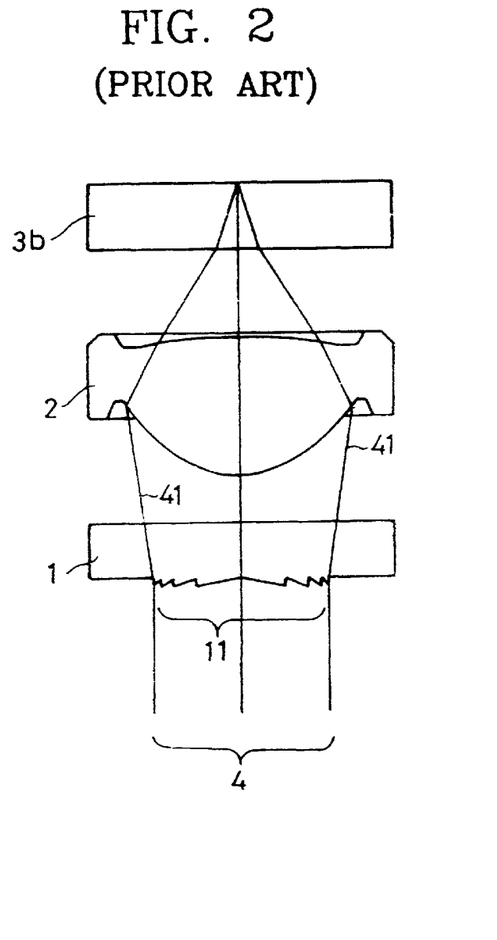

FIGS. 1 and 2 show the focusing of zero-order and first-order-diffracted light onto discs 3a and 3b having different thicknesses, respectively. In each figure, a hologram lens 1, provided with a pattern 11, and a refractive objective lens 2 are provided along the light path in front of discs 3a and 3b. The pattern 11 diffracts a light beam 4 from a light source (not shown) passing through hologram lens 1, to thereby separate the passing light into first-order-diffracted light 41 and zero-order light 40 each of which is focused to a different point on the optical axis with a different intensity by the objective lens 2. The two different focal points are the appropriate focus points on the thicker disc 3b and the thinner disc 3a, respectively and thus enable data read/write operations with respect to discs having different thicknesses.

However, in using such a lens system, the separation of the light into two beams (i.e., the zero order and first order light) by the hologram lens 1 lowers the utilizing efficiency of the actually used (reflected and partially twice diffracted, 1st order) light to about 15%. Also, during the read operation, since the information is included in only one of the two beams and the beam carrying no information is likely to be detected as noise. Moreover, the fabrication of such a hologram lens requires a high-precision process used in etching a fine hologram pattern, which increases manufacturing costs.

Figure 3:
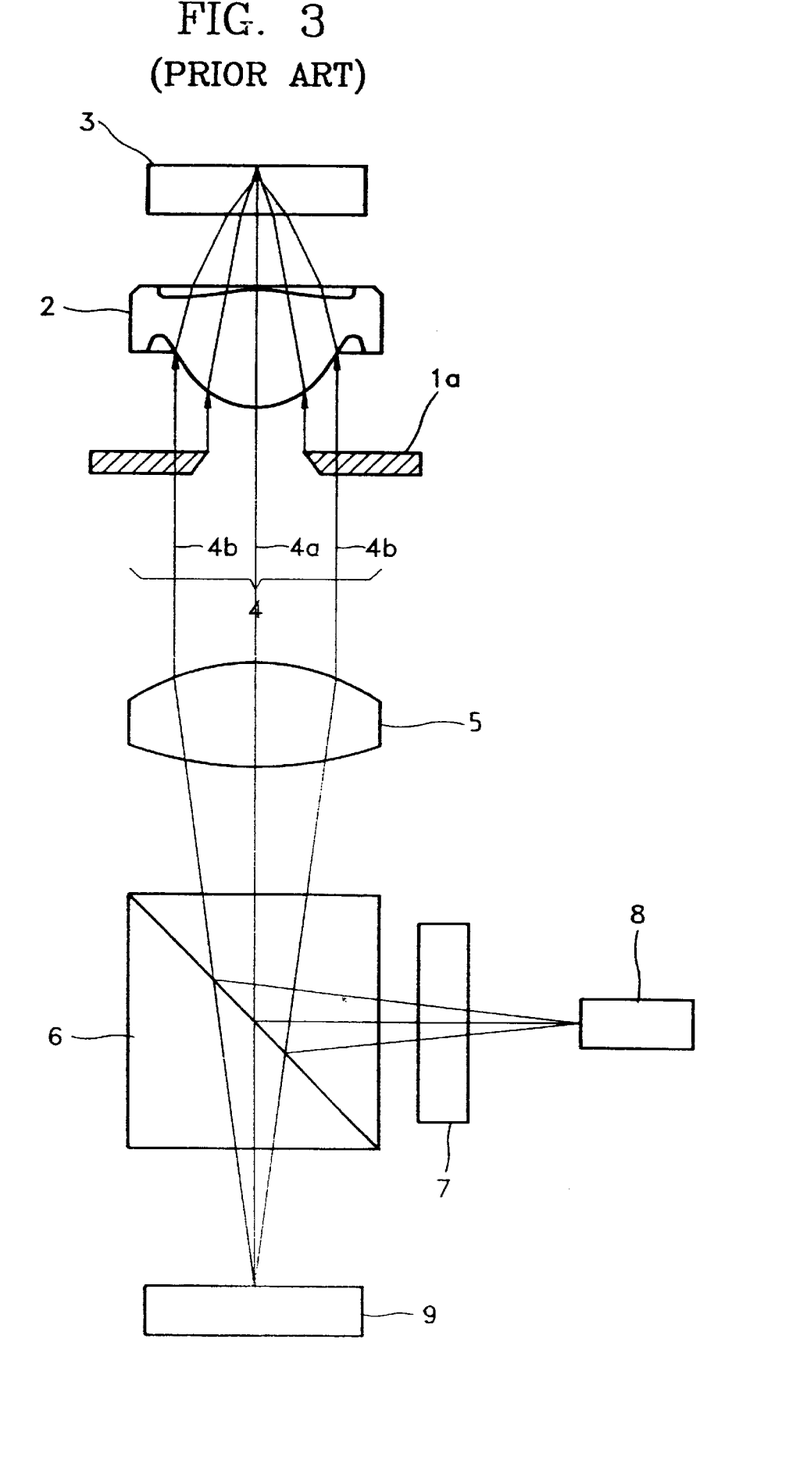
FIG. 3 is a schematic diagram of another conventional optical pickup device.

FIG. 3 is a schematic diagram of another conventional optical pickup device as disclosed in U.S. Pat. No. 5,281,797. This optical pick-up device includes a variable diaphragm 1a for varying the aperture diameter, so that data can be recorded onto a longer wavelength disc as well as a shorter wavelength disc, but with the discs having the same thickness, and information can be reproduced therefrom. The variable diaphragm 1a is installed between the objective lens 2 and a collimating lens 5. The variable diaphragm 1a controls a beam 4 emitted from a light source 9 and transmitted through a beam splitter 6, by appropriately adjusting the area of the beam passing region, i.e., the numerical aperture (NA). The diametral aperture of the variable diaphragm 1a is adjusted in accordance with the focused spot size on the disc being employed and always passes the light beam 4a of the central region but selectively passes or blocks the beam 4b of the peripheral region. In FIG. 3, a reference numeral 3 denotes a disc, a reference numeral 7 denotes a focusing lens and a reference numeral 8 denotes a photodetector.

In the optical device having the above configuration, if the variable diaphragm is formed by a mechanical diaphragm, its structural resonance characteristics change depending on the effective aperture of the diaphragm. The installation of the diaphragm onto an actuator for driving the objective lens becomes difficult in practice. To solve this problem, liquid crystals may be used for forming the diaphragm. This, however, greatly impedes the miniaturization of the system, deteriorates heat-resistance and endurance and increases manufacturing costs.

Alternatively, a separate objective lens for each disc may be provided so that a specific objective lens is used for a specific disc. In this case, however, since a driving apparatus is needed for changing lenses, the configuration becomes complex and the manufacturing cost increases accordingly.

SUMMARY OF THE INVENTION

It is an object of the present invention to provide an optical pickup device which is inexpensive and easily fabricated.

It is another object of the present invention to provide an optical pickup device whose light utilizing efficiency is enhanced and which can form aberration-reduced spots.

To accomplish the above object, there is provided an optical pickup device according to the present invention comprising: a light source; an objective lens provided along a light path of the light source, facing the plane of a disc and having a predetermined effective diameter; a light splitter provided between the objective lens and the light source; a photodetector for detecting the light reflected from the disc and split by the beam splitter; and light controlling means provided in the light path, facing the photodetector lens for controlling the light of the intermediate region between near- and far axis regions of an reflected light beam.

In the optical pickup device according to the present invention, a general spherical lens or Fresnel lens may be used for the objective lens. The light controlling means may be separately provided in a separate member. Otherwise, the light controlling means may be provided in any optical elements positioned along the light path facing the photodetector or photodetector itself.

The light controlling means may be provided as a type of a coating film for blocking, absorbing, scattering or reflecting the light. Also, the light controlling means may be provided as an independent transparent member positioned along the light passing region or a light controlling groove for scattering or reflecting the light between near- and far axis regions positioned in any existing optical elements.

Also, the light controlling film and light controlling groove as the light controlling means may have an annular or perimetrical polygonal (e.g., a square) shape. Also, it is preferred that the light controlling groove is formed to be sloped by a predetermined angle or to be spherical, the bottom plane thereof not being perpendicular with respect to the light path, so that the incident light can be reflected in a direction not parallel with the light path.

In the optical pickup device according to the present invention, it is preferred that the photodetector has a detection region of a size corresponding to the near-axis region light reflected from the thick disc and to the near- and far axis region light reflected from the thin disc, so that only the near-axis light is detected for the thick disc and both the near- and far-axis light is detected for the thin disc.

Further, it is preferred that the photodetector has a first detection region divided into multiple sub-regions and a second detection region divided into multiple sub-regions surrounding the first detection region. At this time, the first detection region has a detection region of a size corresponding to the near-axis region light reflected from the thick disc and to the near- and far axis region light reflected from the thin disc, so that only the near-axis light is detected for the thick disc and both the near- and far-axis light is detected for the thin disc. Also, it is preferred that the second detection region receives the light outside the near axis, i.e., the far axis region light, depending on the distance between the disc and objective lens.

Particularly, it is preferred that the first detection region of the photodetector and the second detection region surrounding the first detection region are both vertically and horizontally symmetrical in terms of overall structure. It is most preferred that the respective regions are divided into four parts to be thus symmetrical.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

In the present invention, the light of the intermediate region between near- and far-axis regions having much of the components of spherical aberration is blocked, shielded or scattered so that the light having less components of spherical aberration reaches the photodetector, thereby stabilizing a focus signal. Thus, a disc drive which can be used compatibly for different kinds of discs having different thicknesses, e.g., 1.2 mm compact disc and 0.6 mm digital video disc, can be easily manufactured at a low cost. The near-axis region represents the region around the central axis of the lens (defined as an optical axis in the optics) having a substantially negligible aberration, the far axis region represents the region which is farther from the optical axis than the near-axis region, and the intermediate region is the region between the near-axis region and the far axis region.

Figure 4:
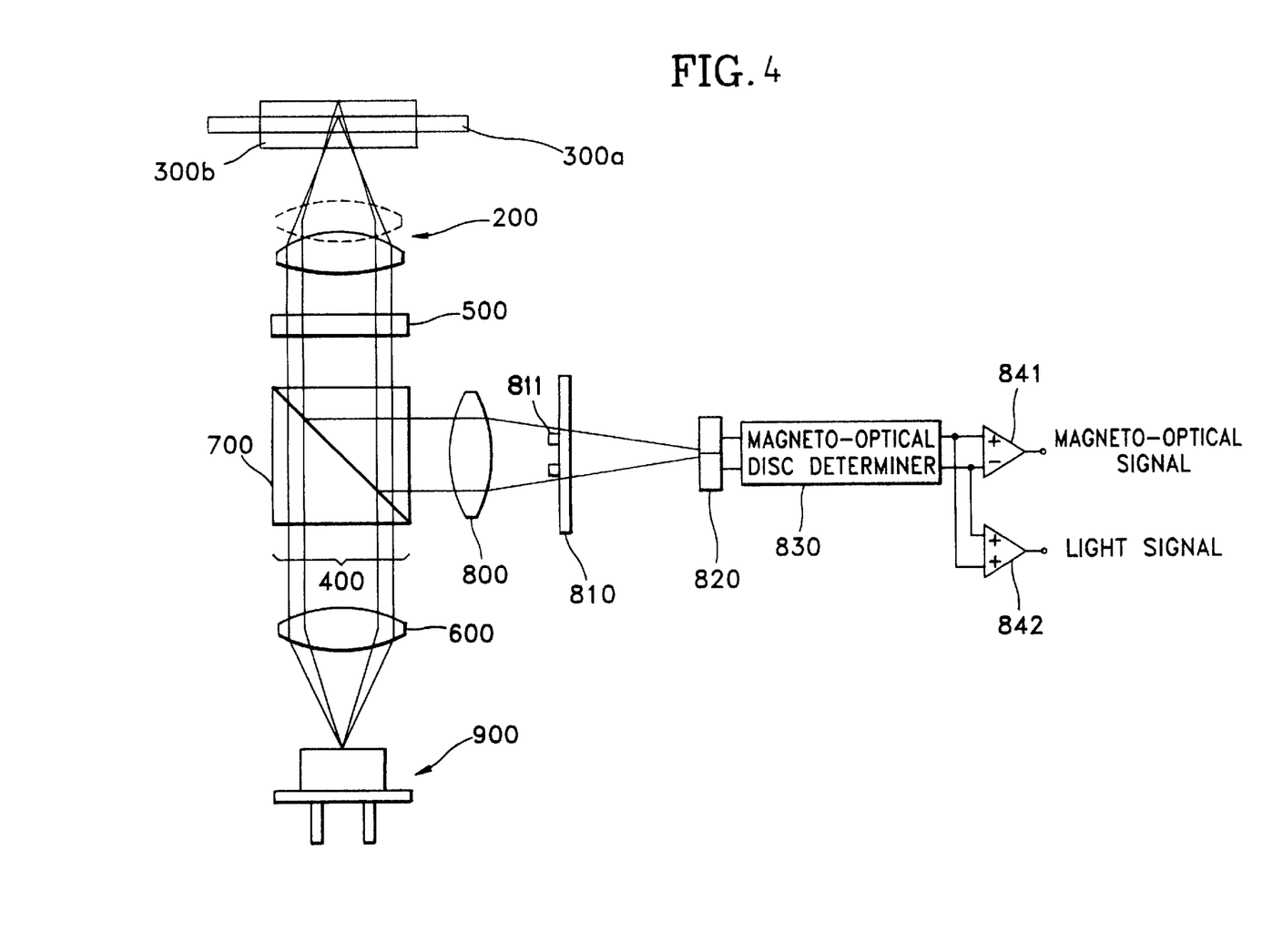
FIG. 4 is a schematic diagram of an optical pickup according to the present invention.

FIG. 4 is a schematic diagram of an optical pickup device according to the present invention, in which the light focusing states of a thin disc and a thick disc are compared.

In FIG. 4, reference numerals 300a and 300b represent a thin disc (e.g., 0.6 mm digital video disc) and a thick disc (e.g., 1.2 mm compact disc), respectively.

A general objective lens 200 is positioned in front of the digital video disc 300a or compact disc 300b. The objective lens 200 having a predetermined effective diameter focuses an incident light 400 from a light source 900 onto the disc 300a or 300b, or receives the light reflected from the disc 300a or 300b. A quarter wavelength plate 500 is provided in the rear of the objective lens 200. A beam splitter 700 is positioned between the quarter wavelength plate 500 and a collimating lens 600 adjacent the light source 900.

A focusing lens 800, a light controlling member 810 as a feature of the present invention and a photodetector 820 are positioned along the light path of the reflected from the beam splitter 700. The photodetector 820 is electrically connected to a magneto-optical disc determiner 830. The photomagnetic disc determiner 830 is connected to a differential amplifier 841 and an adder 842 for obtaining a photomagnetic signal.

In the optical pickup device according to the present invention having the aforementioned configuration, the light controlling member 810 is made of a transparent material and has on its surface a light controlling film 811 for absorbing, scattering or reflecting the light of the intermediate region between near- and far axis region having many components of spherical aberration, among light beams passing through the same and travelling toward the photodetector 820.

Figure 5:
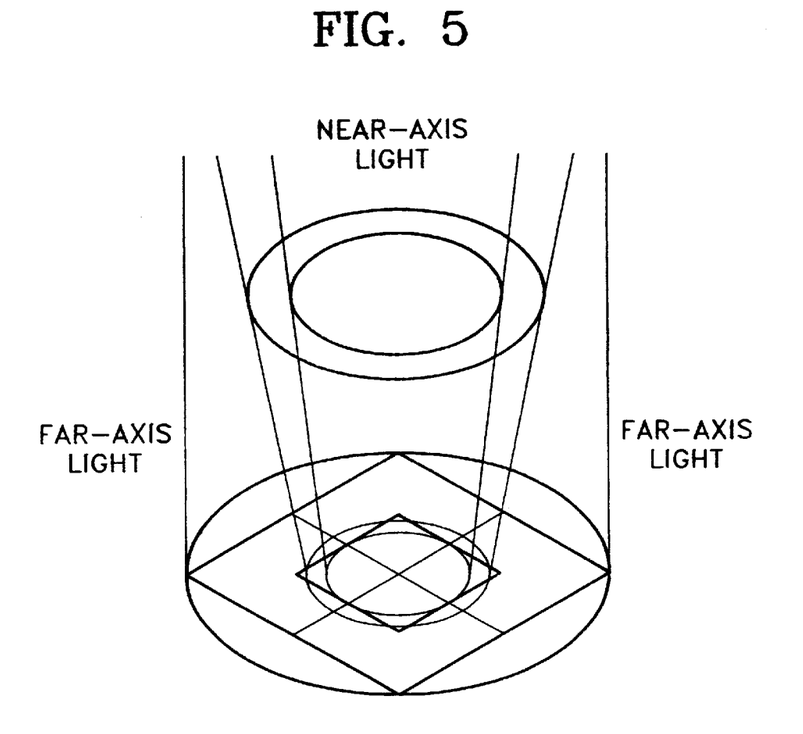
FIG. 5 is an extracted view showing the relationship between a photodetector and a light controlling film in the optical pickup device shown in FIG. 4.

In other words, as shown in FIG. 5, the light controlling film 811 controls (e.g., blocks, absorbs, scatters, diffracts, refracts or reflects) the light of the intermediate region between near- and far axis region having many components of spherical aberration. Therefore, only the light beams of the near- and far axis regions reach the photodetector 820. The light controlling film 811 for blocking the light of the intermediate region may have various shapes such as an annular ring or perimetrical polygon (e.g., square or pentagon). Also, in view of types, the light controlling film 811 may be provided as a coating film or a physical structure for blocking the light travelling path. The light controlling film 811 to be described hereinafter is the one having the broadest meaning.

Figure 6:
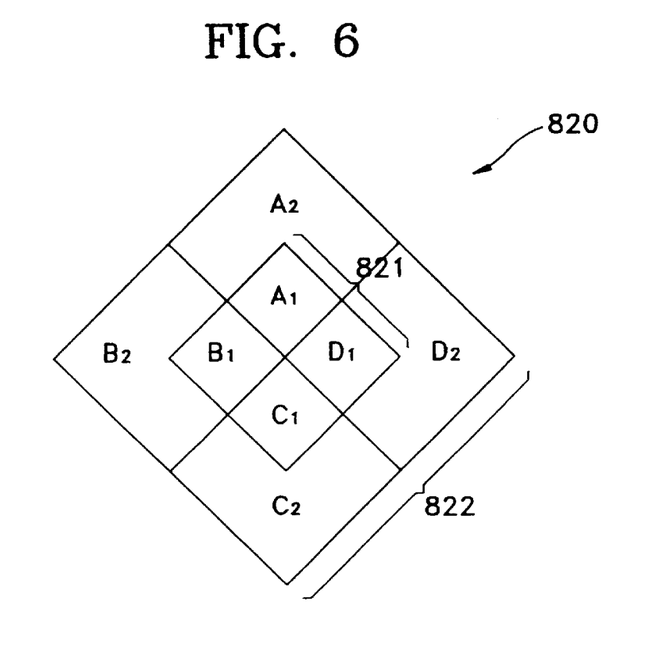
FIG. 6 is a plan view of an eight-segment photodetector adopted for the optical pickup device according to the present invention.

The photodetector 820 has the following structural characteristics.

The photodetector 820 is square in terms of its overall structure. A first detection region 821 divided into four parts is positioned in the center and a second detection region 822 divided into four parts is provided around the first detection region 821. The first detection region 821 includes four square light detecting elements A1, B1, C1 and D1 and the second light detecting region 822 includes four L-shaped light detection elements A2, B2, C2 and D2.

The first detection region 821 is as large as an outer square drawn tangentially with respect to the light distributed region produced by the light passing through the inner side of the light controlling film 811 when the objective lens 200 is in an in-focus state with respect to the digital video disc 300*a*. In this case, the second detection region 822 is large enough to encompass all light beams incident beyond the light controlling film 811. This will be described with reference to FIGS. 7–12 for better understanding.

Figure 7:
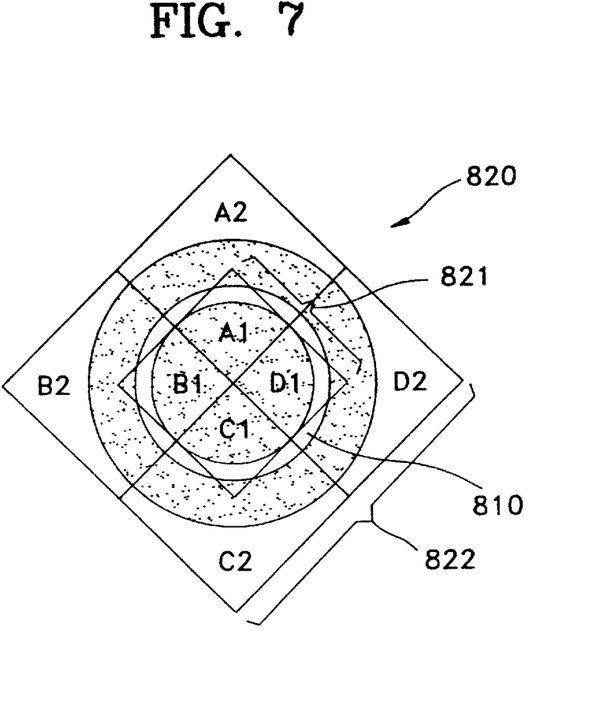
FIGS. 7–12 are plan views showing the light receiving region formed on the eight-segment photodetector, by an objective lens position relative to a thin disc and a thick disc, respectively.

FIG. 7 shows the light distribution when the objective lens 200 is in an in-focus state with respect to the digital video disc 300*a*. The light distributed region of the near axis light passing through the inner side of the light controlling film 811 is internally tangent to the first detection region 821. The light passing through the outer side of the light controlling film 811 is distributed narrowly only in the second detection region 822.

Figure 8:
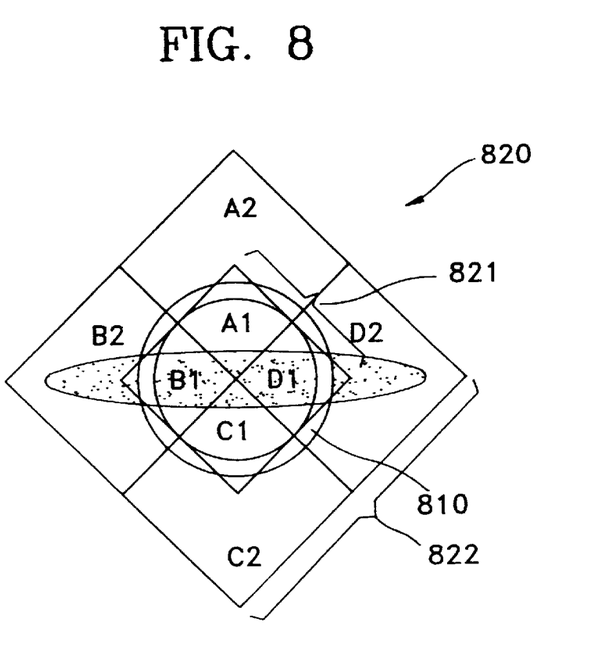

FIG. 8 shows the light distribution when the objective lens 200 is in a far-focus state with respect to the digital video disc 300*a*. In this case, as shown in FIG. 8, the light distribution lies horizontally, that is, throughout the horizontal light receiving elements B2, B1, D1 and D2.

Figure 9:
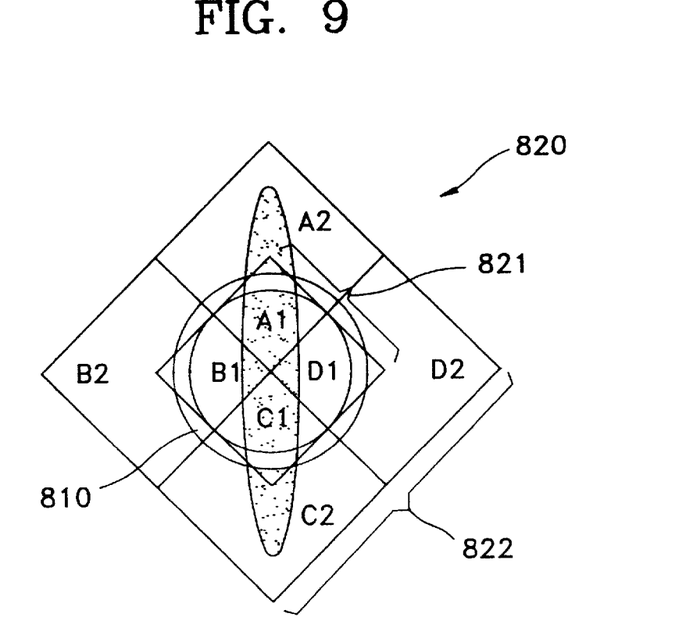

FIG. 9 shows the light distribution when the objective lens 200 is in a near-focus state with respect to the digital video disc 300*a*. In this case, as shown in FIG. 9, the light distributed region is vertically elongated, that is, throughout the vertical light receiving elements A2, A1, C1 and C2.

Figure 10:
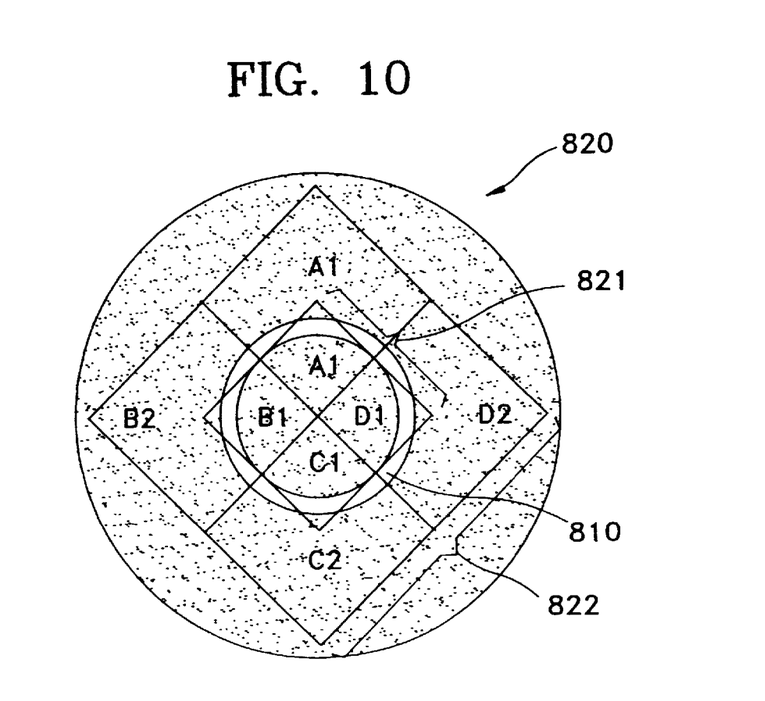

FIG. 10 shows the light distribution when the objective lens 200 is in an in-focus state with respect to the compact disc 300*b*. The light distributed region for the near axis light passing through the inner side of the light controlling film 811 is internally tangent to the first detection region 821, as in the case of the digital video disc 300*b*. The light passing through the outer side of the light controlling film 811 is distributed widely in the second detection region 822 so that the second detection region 822 is internally tangent to the light distributed region for the light passing through the outer side of the light controlling film 811.

Figure 11:
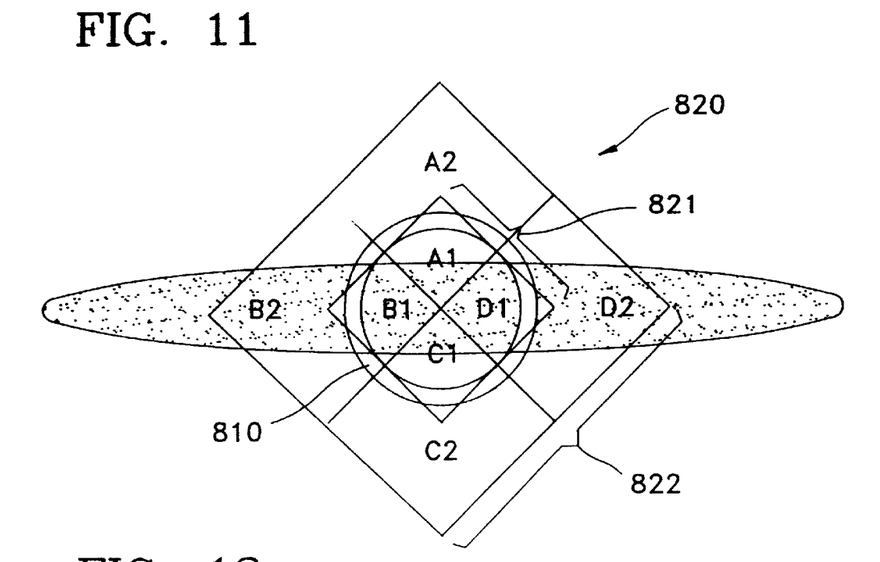

FIG. 11 shows the light distribution when the objective lens 200 is in a far-focus state with respect to the compact disc 300*b*. In this case, as shown in FIG. 11, the light distribution is horizontally elongated, that is, throughout the horizontal light receiving elements B2, B1, D1 and D2. In this case, the light passing through the inner side of the light controlling film 811 is also distributed in the first detection region 821 and the light passing through the outer side of the light controlling film 811 is distributed to be horizontally elongated in the second detection region 822.

Figure 12:
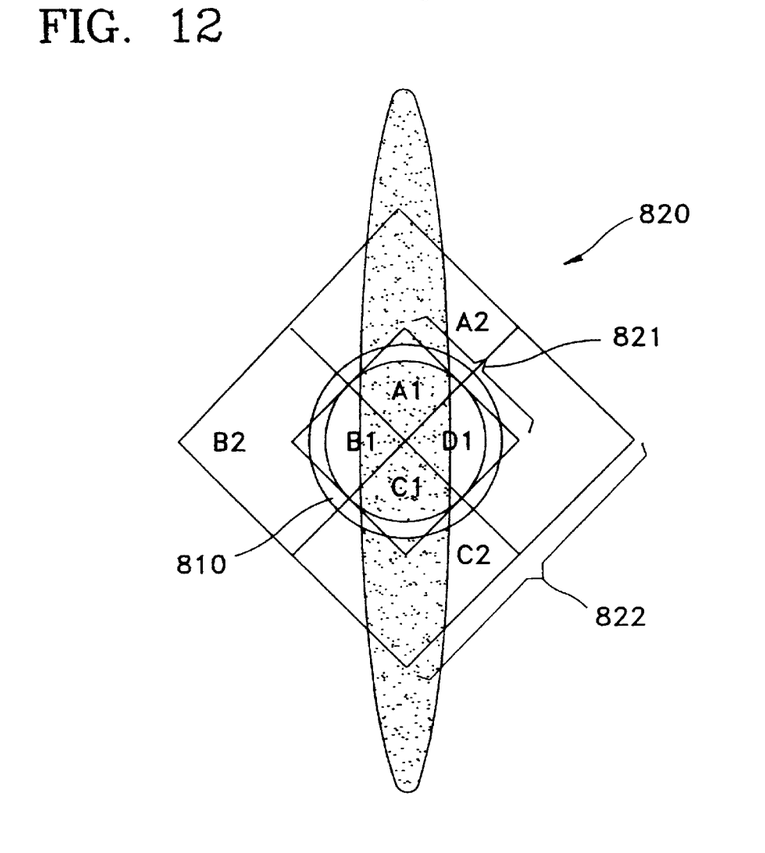

FIG. 12 shows the light distribution when the objective lens 200 is in a near-focus state with respect to the compact disc 300*b*. In this case, unlike in FIG. 11, the light distributed region is vertically elongated, that is, throughout the vertical light receiving elements A2, A1, C1 and C2. However, in this case, the light passing through the inner side of the light controlling film 811 is also distributed in the first detection region 821.

As described above, according to the present invention, only the light passing through the inner side of the light controlling film 811, i.e., the near-axis light having small spherical aberration, reaches the first detection region 821.

In driving the optical pickup device according to the present invention, when information is reproduced or recorded from a thin disc (digital video disc) 300*a*, signals generated from/onto both the first and second detection regions 821 and 822 are used. When information is reproduced or recorded from/onto a thick disc (compact disc) 300*b*, a signal only from the first detection region 821 is used.

Figure 13:
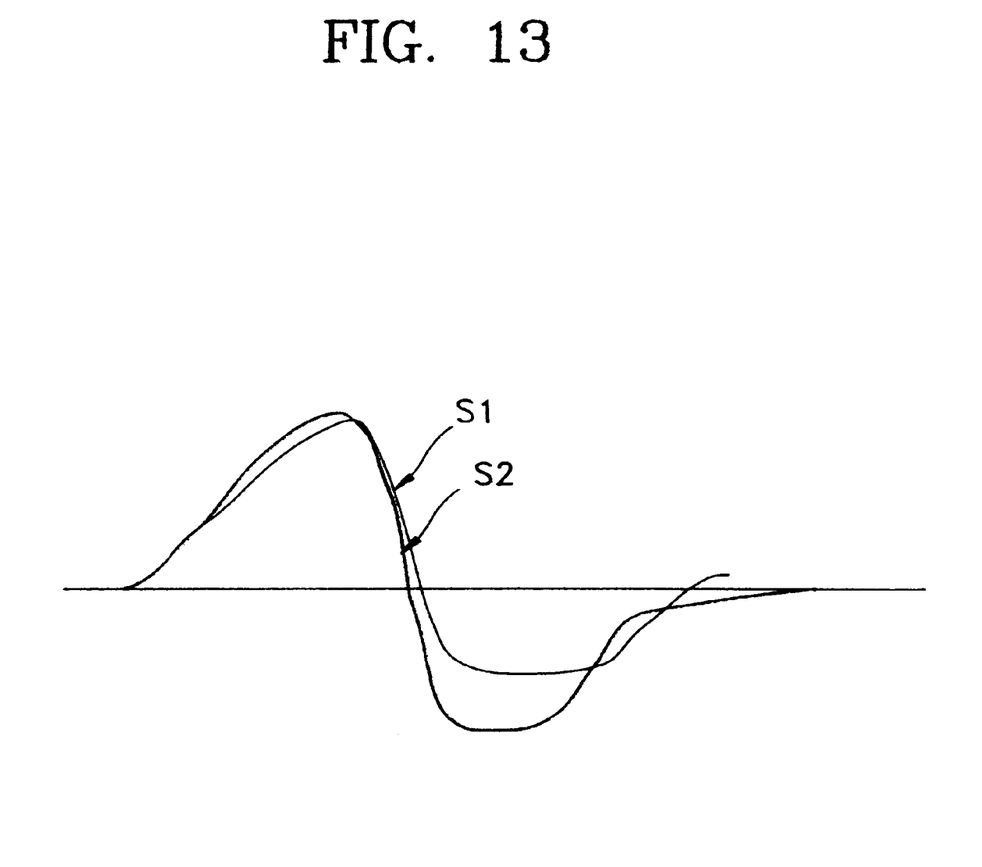
FIG. 13 is a curve of a focus signal obtained from the eight-segment photodetector shown in FIG. 6.

FIG. 13 is a curve for comparing a focus signal S1 obtained from the signal generated only from the first detection region 821 in a state where the light controlling film 811 as a feature of the present invention is used for the thick disc (compact disc) with a focus signal S2 obtained from all the signals generated from the first and second detection regions 821 and 822 in a state where the light controlling film 811 as a feature of the present invention is not used for the thick disc (compact disc). The width of the first detection region 821 for the photodetector used herein is set to 90 μm and that of the second detection region 822 enclosing the first detection region 821 is set to 160 μm. Accordingly, as shown in FIG. 13, in case of using the compact disc 300*b*, if the light controlling film 811 is adopted and the first detection region 821 is used, a more stable focus signal S1 can be obtained, compared to the case when the first and second detection regions 821 and 822 are used. Also, when the compact disc is used, the far-axis light which exhibits a high degree of spherical aberration is made to be widely distributed in the second detection region 822. Thus, the focus signal S2 is increased and the symmetry for the focusing direction can be maintained.

As described above, according to the optical pickup device of the present invention, in order to read information from at least two kinds of discs having different thicknesses, i.e., a compact disc and a digital video disc, a light controlling film and an eight-segment photodetector are adopted so that only the near-axis light is received in the photodetector when the information is read from the compact disc and the near- and far-axis light is received in the photodetector when the information is read from the digital video disc. Therefore, when the thick disc is used, a signal corresponding to the near axis region is obtained. When the thin disc is used, a relatively stable signal corresponding to both regions, i.e., the near and far axes, is obtained.

As described above, compared with the conventional optical pickup device, the optical pickup device according to the present invention adopts a light blocking or scattering means which is simple and easy to fabricate, e.g., a light controlling film formed on a transparent member or a light blocking or scattering groove formed on the objective lens; whereas the conventional optical pickup device adopts a complex and expensive hologram lens. Also, since the light is used without being separated by a hologram lens, the optical pickup device according to the present invention exhibits an improved light utilizing efficiency. Also, since a signal which can discriminate the disc type is obtained, a separate element is not required for discriminating the disc type. The present invention has been described by way of exemplary embodiment to which it is not limited. Variations and modifications will occur to those skilled in the art without departing from the present invention, the scope of which is to be determined from the claims appended hereto.

What is claimed is:

1. An optical pickup device comprising:

a light source;

an objective lens provided along the light path of said light source, facing the plane of a disc and having a predetermined effective diameter;

a beam splitter provided between said objective lens and said light source;

a photodetector for detecting the light split from said beam splitter and reflected from the disc; and light controlling means provided along the light path, facing said photodetector, for controlling the light of the intermediate region between near- and far-axis regions of an incident light beam.

2. An optical pickup device as claimed in claim 1, wherein said light controlling means is provided in a separate transparent member.

3. An optical pickup device as claimed in claim 1, wherein said light controlling means is provided by a coating film which can control the light emitted from said light source.

4. An optical pickup device as claimed in claim 2, wherein said light controlling means is provided by a coating film which can control the light emitted from said light source.

5. An optical pickup device as claimed in claim 3, wherein said photodetector is partitioned into a first detection region divided into multiple parts and a second detection region divided into multiple parts.

6. An optical pickup device as claimed in claim 4, wherein said photodetector is partitioned into a first detection region divided into multiple parts and a second detection region divided into multiple parts.

7. An optical pickup device as claimed in claim 5, wherein said first detection region has the size corresponding to near-axis light reflected from a thick disc and corresponding to near- and far-axis light reflected from a thin disc.

8. An optical pickup device as claimed in claim 6, wherein said first detection region has the size corresponding to near-axis light reflected from a thick disc and corresponding to near- and far-axis light reflected from a thin disc.

9. An optical pickup device as claimed in claim 7, wherein said first and second detection regions of said photodetector are symmetrically divided into four parts and form a square in view of overall structure.

10. An optical pickup device as claimed in claim 8, wherein said first and second detection regions of said photodetector are symmetrically divided into four parts and form a square in view of overall structure.

11. An optical pickup device as claimed in claim 1, wherein said photodetector has the size corresponding to near-axis light reflected from a thick disc and corresponding to near- and far-axis light reflected from a thin disc; and wherein said photodetector is partitioned into a first detection region divided into multiple parts and a second detection region divided into multiple parts.

12. An optical pickup device as claimed in claim 2, wherein said photodetector has the size corresponding to near-axis light reflected from a thick disc and corresponding to near- and far-axis light reflected from a thin disc; and wherein said photodetector is partitioned into a first detection region divided into multiple parts and a second detection region divided into multiple parts.

13. An optical pickup device as claimed in claim 11, wherein said first detection region has the size corresponding to near-axis light reflected from a thick disc and corresponding to near- and far-axis light reflected from a thin disc.

14. An optical pickup device as claimed in claim 12, wherein said first detection region has the size corresponding to near-axis light reflected from a thick disc and corresponding to near- and far-axis light reflected from a thin disc.

15. An optical pickup device as claimed in claim 13, wherein said first and second detection regions of said photodetector are symmetrically divided into four parts and form a square in view of overall structure.

16. An optical pickup device as claimed in claim 14, wherein said first and second detection regions of said photodetector are symmetrically divided into four parts and form a square in view of overall structure.

17. An optical pickup device as claimed in claim 1, wherein said light controlling means is provided on said photodetector.

* * * * *